US008898110B2

(12) United States Patent
Runstedler et al.

(10) Patent No.: US 8,898,110 B2
(45) Date of Patent: Nov. 25, 2014

(54) ELECTRONIC DEVICE AND METHOD FOR MANAGING STORAGE OF DATA

(75) Inventors: Christopher Runstedler, Waterloo (CA); Earl Wikkerink, Waterloo (CA); Brian Groux, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/603,334

(22) Filed: Sep. 4, 2012

(65) Prior Publication Data

US 2012/0330896 A1 Dec. 27, 2012

Related U.S. Application Data

(63) Continuation of application No. 12/437,030, filed on May 7, 2009, now Pat. No. 8,285,675.

(60) Provisional application No. 61/052,319, filed on May 12, 2008.

(51) Int. Cl.
*G06F 17/30* (2006.01)
*G06Q 10/00* (2012.01)

(52) U.S. Cl.
CPC .......... *G06Q 10/00* (2013.01); *G06F 17/30575* (2013.01)
USPC ...................................... 707/610

(58) Field of Classification Search
CPC .............. G06F 17/30575; G06F 17/30286; G06F 17/303
USPC .......... 707/610–611, 617, 621, 634
See application file for complete search history.

(56) References Cited

U.S. PATENT DOCUMENTS

| | | | |
|---|---|---|---|
| 6,131,096 A * | 10/2000 | Ng et al. | 1/1 |
| 6,751,626 B2 | 6/2004 | Brown et al. | |
| 7,333,976 B1 | 2/2008 | Auerbach et al. | |
| 2002/0069298 A1 | 6/2002 | Birkler et al. | |
| 2003/0206197 A1 | 11/2003 | McInerney | |
| 2004/0093317 A1 * | 5/2004 | Swan | 707/1 |
| 2004/0199921 A1 | 10/2004 | Snader et al. | |
| 2005/0097225 A1 * | 5/2005 | Glatt et al. | 709/248 |
| 2006/0020804 A1 | 1/2006 | Schleifer et al. | |
| 2006/0218224 A1 | 9/2006 | Agrawal et al. | |
| 2006/0242210 A1 | 10/2006 | Ring et al. | |

OTHER PUBLICATIONS http://www.bitpim.org/help/dialog-mergingphonebookentries.htm, published at least as early as May 7, 2009.

(Continued)

*Primary Examiner* — Thu-Nguyet Le
(74) *Attorney, Agent, or Firm* — Geoffrey deKleine; Borden Ladner Gervais LLP

(57) ABSTRACT

A method of managing storage of address book data records at an electronic device includes provisioning, at the electronic device, a new Personal Information Manager (PIM) service account including address book functionality on the electronic device, automatically updating, by the electronic device, address book data records stored on the electronic device and not associated with another PIM service account to associate the address book data records with the new PIM service account provisioned on the electronic device in response to provisioning the new PIM service account, and sending, from the electronic device, the updated address book data records for storage at the PIM service account thereby merging the address book data records stored only at the electronic device with address book data records at the new PIM service account.

20 Claims, 8 Drawing Sheets

(56) References Cited

OTHER PUBLICATIONS http://www.avanquest.com/USA/software/mobile-phonetools-4-bluetooth-versions-27440, published at least as early as May 7, 2009.
http://en.wikipedia.org/wiki/IBM_Lotus_Notes, published at least as early as May 7, 2009.
http://www.kerio.com/connect/platform, published at least as early as May 7, 2009.
http://web.archive.org/web/20070901221539/http://www.plaxo.com/about/releases/release-20061031, published Oct. 31, 2006.
http://web.archive.org/web/20070628233350/http://www.plaxo.com/about/releases/release-20070625, published Jun. 25, 2007.
Summons to attend oral proceedings dated Mar. 18, 2014, issued from the corresponding European patent application No. 09159647.8.

* cited by examiner

ELECTRONIC DEVICE AND METHOD FOR MANAGING STORAGE OF DATA

CROSS-REFERENCE TO RELATED APPLICATIONS

This application is a continuation of U.S. patent application Ser. No. 12/437,030 filed May 7, 2009, which claims the benefit of priority of U.S. Provisional Patent Application No. 61/052,319, filed May 12, 2008, which is incorporated herein by reference.

TECHNICAL FIELD

The present application relates to electronic devices PIM applications, particularly address book functionality, for storage and display of address book data records.

BACKGROUND DISCUSSION

Many electronic devices such as desktop computers or mobile stations including simple cellular telephones, smart telephones, wireless personal digital assistants (PDAs), and laptop computers with wireless 802.11 or Bluetooth capabilities, include PIM applications with address book functionality for storing and viewing address book data records in a graphical user interface. The information for contacts such as names, addresses, contact phone numbers, fax numbers, email addresses and other data can be saved in a respective address book data record and is viewable in a graphical user interface. Such applications are useful for maintaining contact information.

With many portable electronic devices such as cellular telephones, smart telephones, and wireless PDAs, address book data records can be created and saved using an address book application at the portable electronic device. Thus, address book data records can be created and saved using an address book application at the portable electronic device. Address book data records can also be created and saved on another electronic device such as a desktop or laptop computer, using a PIM service application on or accessed by the desktop or laptop computer. These address book data records can be synchronized or transferred to the portable electronic device by wired or wireless connection. Thus, the address book data records are stored at both the desktop computer and at the portable electronic device such that the address book data records at the electronic device mirror those at the desktop computer. This permits convenient viewing of the address book data records using the respective address book application at either the portable electronic device or the desktop computer and provides a backup for storage of address book data records to help reduce the chance of loss of address book data records.

In some cases, users choose to keep different PIM data records in different PIM service accounts depending on the nature of the data record. For example a user may choose to store all business-related address book data records using a calendar application at an enterprise computer while all personal-related time-dependent events are stored in an alternate address book application, for example using an online PIM service account such as those offered by Google™ or Yahoo!™. Some of these online PIM service accounts permit the user to transfer PIM data records from the online PIM service account to the portable electronic device and vice versa. Unfortunately, when address book data records are transferred from any of these services to the portable electronic device, all address book data records on the device can be deleted or all the address book data records are indiscriminately merged on the portable electronic device. If merged, multiple sets of address book data are displayed and are indistinguishable on the portable electronic device. Later synchronization with, for example, the enterprise (desktop) computer results in transfer of all personal PIM records (originating from the online PIM service account) to the desktop computer, thereby merging both personal and business related PIM data records.

It would be advantageous to improve management of storage of address book data records at the portable electronic device.

BRIEF DESCRIPTION OF THE DRAWINGS

Embodiments of the present application will now be described, by way of example only, with reference to the attached Figures, wherein:

FIG. 4 is a block diagram illustrating components of an example configuration of a host system that the portable electronic device can communicate with;

DETAILED DESCRIPTION

Figure 1:
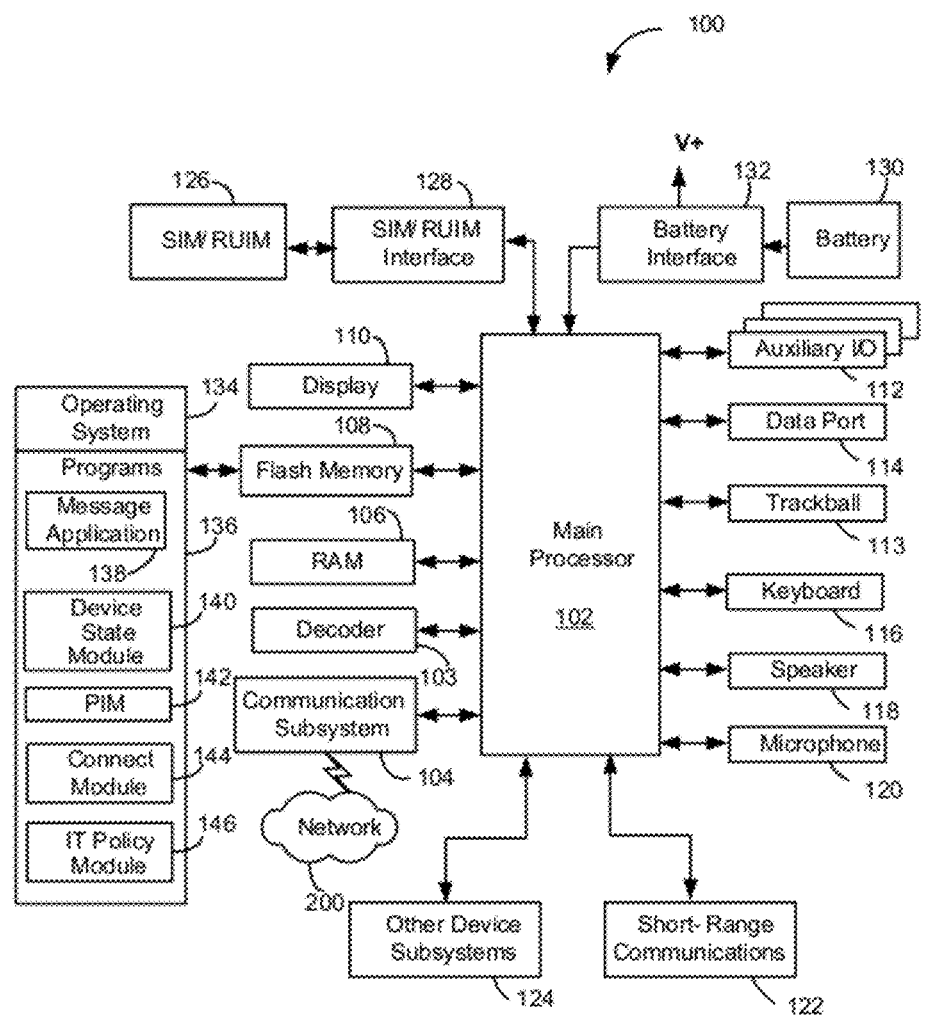
FIG. 1 is a block diagram of an example embodiment of a portable electronic device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

The example embodiments described herein generally relate to portable electronic devices. Examples of portable electronic devices include mobile or handheld wireless communication devices such as pagers, cellular phones, cellular smart-phones, wireless organizers, personal digital assistants, computers, laptops, handheld wireless communication devices, wirelessly enabled notebook computers and the like.

The portable electronic device may be a two-way communication device with advanced data communication capabilities including the capability to communicate with other portable electronic devices or computer systems through a network of transceiver stations. The portable electronic device may also have the capability to allow voice communication. Depending on the functionality provided by the portable electronic device, it may be referred to as a data messaging device, a two-way pager, a cellular telephone with data messaging capabilities, a wireless Internet appliance, or a data communication device (with or without telephony capabilities). To aid the reader in understanding the structure of the portable electronic device and how it communicates with other devices and host systems, reference will now be made to FIGS. 1 through 4.

Referring first to FIG. 1, shown therein is a block diagram of an example embodiment of a portable electronic device 100. The portable electronic device 100 includes a number of components such as a main processor 102 that controls the overall operation of the portable electronic device 100. Communication functions, including data and voice communications, are performed through a communication subsystem 104. Data received by the portable electronic device 100 can be decompressed and decrypted by a decoder 103, operating according to any suitable decompression techniques (e.g. YK decompression, and other known techniques) and encryption techniques (e.g. using an encryption technique such as Data Encryption Standard (DES), Triple DES, or Advanced Encryption Standard (AES)). The communication subsystem 104 receives messages from and sends messages to a wireless network 200. In this example embodiment of the portable electronic device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the example embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with portable electronic device 100 is a GSM/GPRS wireless network in one example implementation, other wireless networks may also be associated with the portable electronic device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks such as EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems. The main processor 102 also interacts with additional subsystems such as a Random Access Memory (RAM) 106, a flash memory 108, a display 110, an auxiliary input/output (I/O) subsystem 112, a data port 114, a trackball 113, a keyboard 116, a speaker 118, a microphone 120, short-range communications 122 and other device subsystems 124.

Some of the subsystems of the portable electronic device 100 perform communication-related functions, whereas other subsystems may provide "resident" or on-device functions. By way of example, the display 110, the trackball 113 and the keyboard 116 may be used for both communication-related functions, such as entering a text message for transmission over the network 200, and device-resident functions such as a calculator or task list.

The portable electronic device 100 can send and receive communication signals over the wireless network 200 after network registration or activation procedures have been completed. Network access is associated with a subscriber or user of the portable electronic device 100. To identify a subscriber, a SIM/RUIM card 126 (i.e. Subscriber Identity Module or a Removable User Identity Module) is inserted into a SIM/RUIM interface 128 in order to communicate with a network. The SIM/RUIM card 126 is a type of a conventional "smart card" that can be used to identify a subscriber of the portable electronic device 100 and to personalize the portable electronic device 100, among other things. In the present example embodiment, the portable electronic device 100 is not fully operational for communication with the wireless network 200 without the SIM/RUIM card 126. By inserting the SIM/RUIM card 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical portable electronic device. The SIM card/RUIM 126 may store additional subscriber information for a portable electronic device as well, including address book data records and recent call information. Alternatively, user identification information can also be programmed into the flash memory 108.

The portable electronic device 100 is a battery-powered device and includes a battery interface 132 for receiving one or more rechargeable batteries 130. In at least some example embodiments, the battery 130 can be a smart battery with an embedded microprocessor. The battery interface 132 is coupled to a regulator (not shown), which assists the battery 130 in providing power V+ to the portable electronic device 100. Although current technology makes use of a battery, future technologies such as micro fuel cells may provide the power to the portable electronic device 100.

The portable electronic device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications are installed on the portable electronic device 100 during its manufacture. Other software applications include a message application 138 that can be any suitable software program that allows a user of the portable electronic device 100 to send and receive electronic messages. Various alternatives exist for the message application 138 as is well known to those skilled in the art. Messages that have been sent or received by the user are typically stored in the flash memory 108 of the portable electronic device 100 or some other suitable storage element in the portable electronic device 100. In at least some example embodiments, some of the sent and received messages may be stored remotely from the device 100 such as in a data store of an associated host system that the portable electronic device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the portable electronic device 100 is turned off or loses power.

The PIM 142 includes functionality for organizing and managing data items of interest to the user, such as, but not limited to, e-mail, address book data records, calendar event data records, voice mails, and task data records. PIM applications include, for example, calendar, address book, tasks and memo applications. The PIM applications have the ability to send and receive data items via the wireless network 200. PIM data items may be seamlessly integrated, synchronized, and updated via the wireless network 200 with the portable electronic device subscriber's corresponding data items stored and/or associated with a host computer system. This functionality creates a mirrored host computer on the portable electronic device 100 with respect to such items. This can be particularly advantageous when the host computer system is the portable electronic device subscriber's office computer system.

The portable electronic device 100 also includes a connect module 144, and an information technology (IT) policy module 146. The connect module 144 implements the communication protocols that are required for the portable electronic device 100 to communicate with the wireless infrastructure and any host system, such as an enterprise system, that the portable electronic device 100 is authorized to interface with. Examples of a wireless infrastructure and an enterprise system are given in FIGS. 3 and 4, which are described in more detail below.

The connect module 144 includes a set of APIs that can be integrated with the portable electronic device 100 to allow the portable electronic device 100 to use any number of services associated with the enterprise system. The connect module 144 allows the portable electronic device 100 to establish an end-to-end secure, authenticated communication pipe with the host system. A subset of applications for which access is provided by the connect module 144 can be used to pass IT policy commands from the host system to the portable electronic device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be provided on the portable electronic device 100 and still others can be installed on the portable electronic device 100. Such software applications can be third party applications, which are added after the manufacture of the portable electronic device 100. Examples of third party applications include games, calculators, utilities, etc.

The additional applications can be loaded onto the portable electronic device 100 through at least one of the wireless network 200, the auxiliary I/O subsystem 112, the data port 114, the short-range communications subsystem 122, or any other suitable device subsystem 124. This flexibility in application installation increases the functionality of the portable electronic device 100 and may provide enhanced on-device functions, communication-related functions, or both. For example, secure communication applications may enable electronic commerce functions and other such financial transactions to be performed using the portable electronic device 100.

The data port 114 enables a subscriber to set preferences through an external device or software application and extends the capabilities of the portable electronic device 100 by providing for information or software downloads to the portable electronic device 100 other than through a wireless communication network. The alternate download path may, for example, be used to load an encryption key onto the portable electronic device 100 through a direct and thus reliable and trusted connection to provide secure device communication.

The data port 114 can be any suitable port that enables data communication between the portable electronic device 100 and another computing device. The data port 114 can be a serial or a parallel port. In some instances, the data port 114 can be a USB port that includes data lines for data transfer and a supply line that can provide a charging current to charge the battery 130 of the portable electronic device 100.

The short-range communications subsystem 122 provides for communication between the portable electronic device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, Web page download, or any other information is processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the portable electronic device 100 is substantially similar, except that the received signals are output to the speaker 118, and signals for transmission are generated by the microphone 120. Alternative voice or audio I/O subsystems, such as a voice message recording subsystem, can also be implemented on the portable electronic device 100. Although voice or audio signal output is accomplished primarily through the speaker 118, the display 110 can also be used to provide additional information such as the identity of a calling party, duration of a voice call, or other voice call related information.

Figure 2:
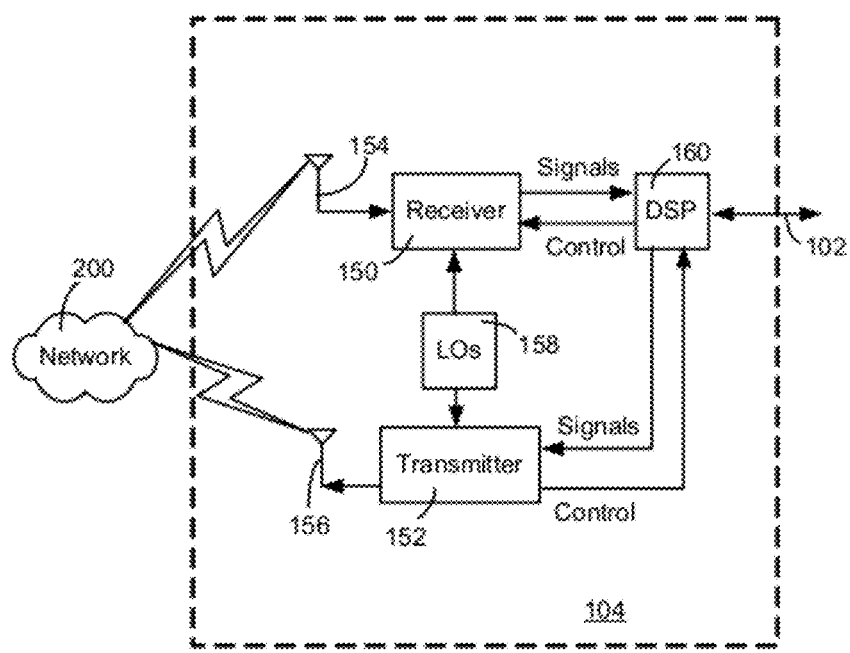
FIG. 2 is an exemplary block diagram of a communication subsystem component of FIG. 1.

Referring now to FIG. 2, an example block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the portable electronic device 100 is intended to operate. Thus, it should be understood that the design illustrated in FIG. 2 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. ND conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the portable electronic device 100 and the wireless network 200 can contain one or more different channels, typically different RF channels, and associated protocols used between the portable electronic device 100 and the wireless network 200. An RF channel is a limited resource that should be conserved, typically due to limits in overall bandwidth and limited battery power of the portable electronic device 100.

When the portable electronic device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 3:
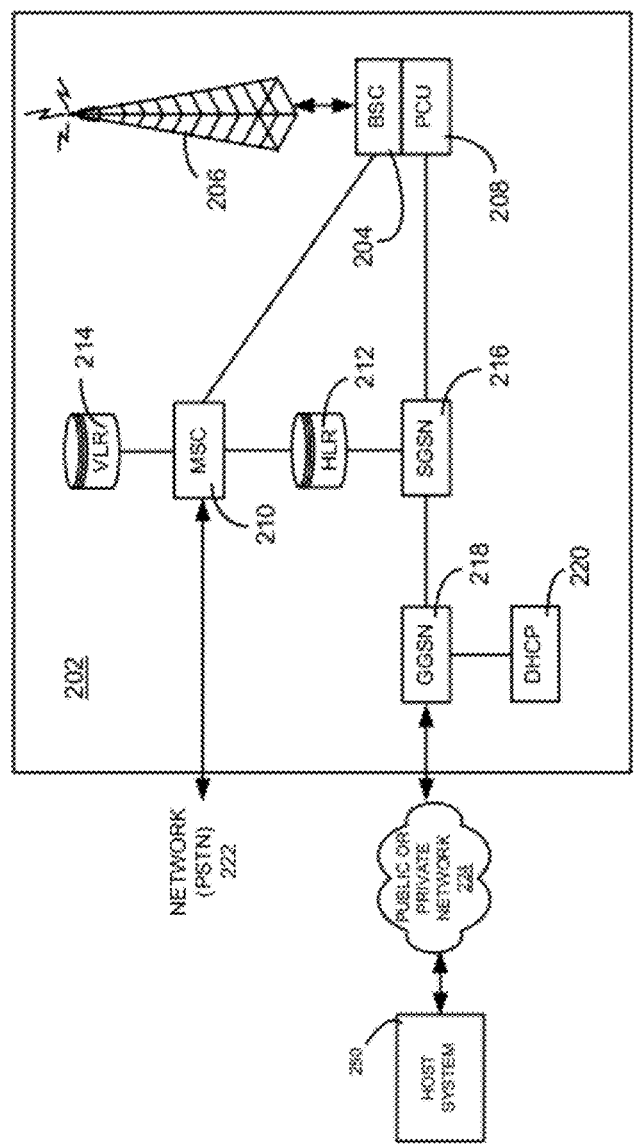
FIG. 3 is a block diagram of an example implementation of a node of a wireless network.

Referring now to FIG. 3, a block diagram of an example implementation of a node 202 of the wireless network 200 is shown. In practice, the wireless network 200 includes one or more nodes 202. In conjunction with the connect module 144, the portable electronic device 100 can communicate with the node 202 within the wireless network 200. In the example implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable portable electronic devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the portable electronic device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from portable electronic devices within its cell via the station 206. The fixed transceiver equipment normally performs such functions as modulation and possibly encoding and/or encryption of signals to be transmitted to the portable electronic device 100 in accordance with particular, usually predetermined, communication protocols and parameters, under control of its controller. The fixed transceiver equipment similarly demodulates and possibly decodes and decrypts, if necessary, any communication signals received from the portable electronic device 100 within its cell. Communication protocols and parameters may vary between different nodes. For example, one node may employ a different modulation scheme and operate at different frequencies than other nodes.

For all portable electronic devices 100 registered with a specific network, permanent configuration data such as a user profile is stored in the HLR 212. The HLR 212 also contains location information for each registered portable electronic device and can be queried to determine the current location of a portable electronic device. The MSC 210 is responsible for a group of location areas and stores the data of the portable electronic devices currently in its area of responsibility in the VLR 214. Further, the VLR 214 also contains information on portable electronic devices that are visiting other networks. The information in the VLR 214 includes part of the permanent portable electronic device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each portable electronic device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given portable electronic device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a portable electronic device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each portable electronic device 100 must be assigned to one or more APNs and portable electronic devices 100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a portable electronic device 100 is not using its PDP Context, the PDP Context can be de-allocated and the IP address returned to the IP address pool managed by the DHCP server 220.

Figure 4:
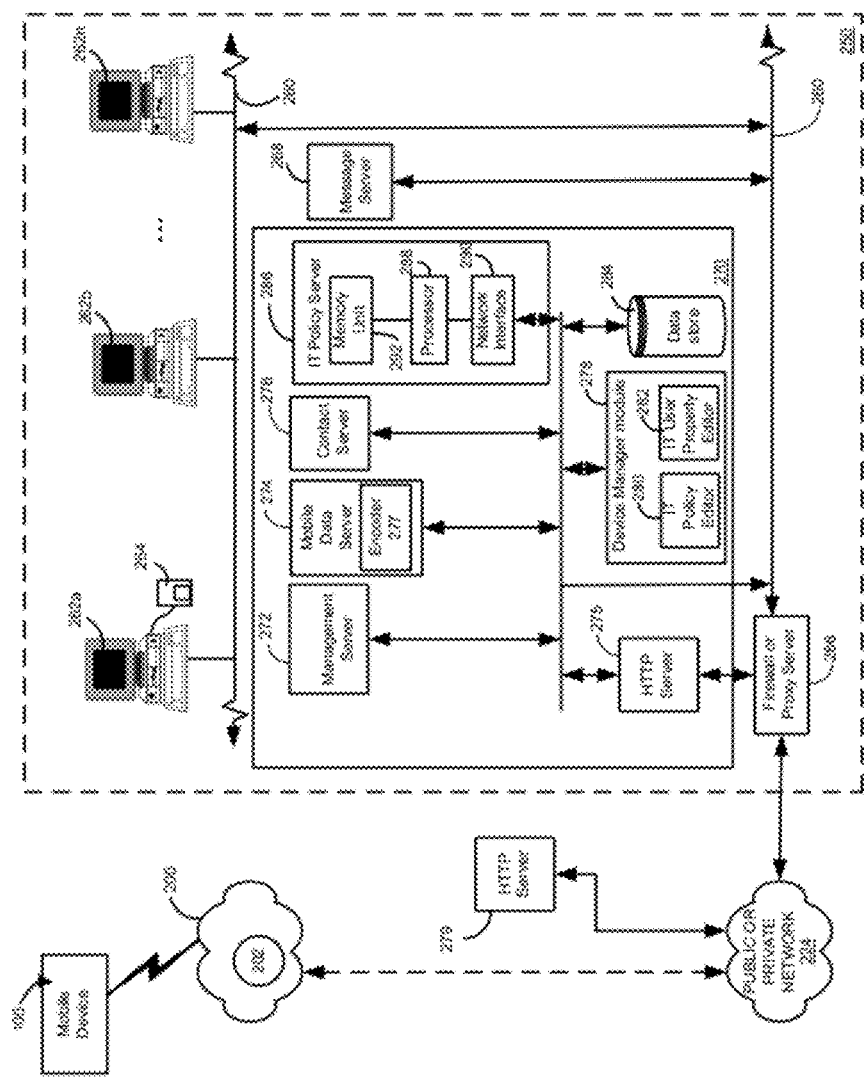

Referring now to FIG. 4, shown therein is a block diagram illustrating components of an example configuration of a host system 250 that the portable electronic device 100 can communicate with in conjunction with the connect module 144. The host system 250 will typically be a corporate enterprise or other local area network (LAN), but may also be a home office computer or some other private system, for example, in variant implementations. In this example shown in FIG. 4, the host system 250 is depicted as a LAN of an organization to which a user of the portable electronic device 100 belongs. Typically, a plurality of portable electronic devices can communicate wirelessly with the host system 250 through one or more nodes 202 of the wireless network 200.

The host system 250 includes a number of network components connected to each other by a network 260. For instance, a user's desktop computer 262a with an accompanying cradle 264 for the user's portable electronic device 100 is situated on a LAN connection. The cradle 264 for the portable electronic device 100 can be coupled to the computer 262a by a serial or a Universal Serial Bus (USB) connection, for example. Other user computers 262b-262n are also situated on the network 260, and each may or may not be equipped with an accompanying cradle 264. The cradle 264 facilitates the loading of information (e.g. PIM data, private symmetric encryption keys to facilitate secure communications, and other data) from the user computer 262a to the portable electronic device 100, and may be particularly useful for bulk information updates often performed in initializing the portable electronic device 100 for use. The information downloaded to the portable electronic device 100 may include certificates used in the exchange of messages.

It will be understood by persons skilled in the art that the user computers 262a-262n will typically also be connected to other peripheral devices, such as printers, etc. which are not explicitly shown in FIG. 4. Furthermore, only a subset of network components of the host system 250 are shown in FIG. 4 for ease of exposition, and it will be understood by persons skilled in the art that the host system 250 will include additional components that are not explicitly shown in FIG. 4 for this example configuration. More generally, the host system 250 may represent a smaller part of a larger network (not shown) of the organization, and may include different components and/or be arranged in different topologies than that shown in the example embodiment of FIG. 4.

To facilitate the operation of the portable electronic device 100 and the wireless communication of messages and message-related data between the portable electronic device 100 and components of the host system 250, a number of wireless communication support components 270 can be provided. In some implementations, the wireless communication support components 270 can include a management server 272, a mobile data server (MDS) 274, a web server, such as Hypertext Transfer Protocol (HTTP) server 275, a contact server 276, and a device manager module 278. HTTP servers can also be located outside the enterprise system, as indicated by the HTTP server 275 attached to the network 224. The device manager module 278 includes an IT Policy editor 280 and an IT user property editor 282, as well as other software components for allowing an IT administrator to configure the portable electronic devices 100. In an alternative example embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the portable electronic devices 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this example embodiment, the portable electronic device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the portable electronic device 100. The wireless VPN router allows a VPN connection to be established directly through a specific wireless network to the portable electronic device 100. The wireless VPN router can be used with the Internet Protocol (IP) Version 6 (IPV6) and IP-based wireless networks. This protocol can provide enough IP addresses so that each portable electronic device has a dedicated IP address, making it possible to push information to a portable electronic device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the portable electronic device 100 in this alternative implementation.

Messages intended for a user of the portable electronic device 100 are initially received by a message server 268 of the host system 250. Such messages may originate from any number of sources. For instance, a message may have been sent by a sender from the computer 262b within the host system 250, from a different portable electronic device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some example implementations of the message server 268 include a Microsoft Exchange™ server, a Lotus Domino™ server, a Novell Groupwise™ server, or another suitable mail server installed in a corporate environment. In some implementations, the host system 250 may include multiple message servers 268. The message server provides additional functions including PIM functions such as calendaring, address book and tasks and supports data storage.

When messages are received by the message server 268, they are typically stored in a data store associated with the message server 268. In at least some example embodiments, the data store may be a separate hardware unit, such as data store 284, that the message server 268 communicates with. Messages can be subsequently retrieved and delivered to users by accessing the message server 268. For instance, an e-mail client application operating on a user's computer 262a may request the e-mail messages associated with that user's account stored on the data store associated with the message server 268. These messages are then retrieved from the data store and stored locally on the computer 262a. The data store associated with the message server 268 can store copies of each message that is locally stored on the portable electronic device 100. Alternatively, the data store associated with the message server 268 can store all of the messages for the user of the portable electronic device 100 and only a smaller number of messages can be stored on the portable electronic device 100 to conserve memory. For instance, the most recent messages (i.e. those received in the past two to three months for example) can be stored on the portable electronic device 100.

When operating the portable electronic device 100, the user may wish to have e-mail messages retrieved for delivery to the portable electronic device 100. The message application 138 operating on the portable electronic device 100 may also request messages associated with the user's account from the message server 268. The message application 138 may be configured (either by the user or by an administrator, possibly in accordance with an organization's IT policy) to make this request at the direction of the user, at some predefined time interval, or upon the occurrence of some predefined event. In some implementations, the portable electronic device 100 is assigned its own e-mail address, and messages addressed specifically to the portable electronic device 100 are automatically redirected to the portable electronic device 100 as they are received by the message server 268.

The management server 272 can be used to specifically provide support for the management of, for example, messages, such as e-mail messages, that are to be handled by portable electronic devices. Generally, while messages are still stored on the message server 268, the management server 272 can be used to control when, if, and how messages are sent to the portable electronic device 100. The management server 272 also facilitates the handling of messages composed on the portable electronic device 100, which are sent to the message server 268 for subsequent delivery.

For example, the management server 272 may monitor the user's "mailbox" (e.g. the message store associated with the user's account on the message server 268) for new e-mail messages, and apply user-definable filters to new messages to determine if and how the messages are relayed to the user's portable electronic device 100. The management server 272 may also, through an encoder 273, compress messages, using any suitable compression technology (e.g. YK compression, and other known techniques) and encrypt messages (e.g. using an encryption technique such as Data Encryption Standard (DES), Triple DES, or Advanced Encryption Standard (AES)), and push them to the portable electronic device 100 via the shared network infrastructure 224 and the wireless network 200. The management server 272 may also receive messages composed on the portable electronic device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the portable electronic device 100 can be defined (e.g. by an administrator in accordance with IT policy) and enforced by the management server 272. These may include whether the portable electronic device 100 may receive encrypted and/or signed messages, minimum encryption key sizes, whether outgoing messages must be encrypted and/or signed, and whether copies of all secure messages sent from the portable electronic device 100 are to be sent to a pre-defined copy address, for example.

The management server 272 may also be adapted to provide other control functions, such as only pushing certain message information or pre-defined portions (e.g. "blocks") of a message stored on the message server 268 to the portable electronic device 100. For example, in some cases, when a message is initially retrieved by the portable electronic device 100 from the message server 268, the management server 272 may push only the first part of a message to the portable electronic device 100, with the part being of a pre-defined size (e.g. 2 KB). The user can then request that more of the message be delivered in similar-sized blocks by the management server 272 to the portable electronic device 100, possibly up to a maximum pre-defined message size. Accordingly, the management server 272 facilitates better control over the type of data and the amount of data that is communicated to the portable electronic device 100, and can help to minimize potential waste of bandwidth or other resources.

The MDS 274 encompasses any other server that stores information that is relevant to the corporation. The mobile data server 274 may include, but is not limited to, databases, online data document repositories, customer relationship management (CRM) systems, or enterprise resource planning (ERP) applications. The MDS 274 can also connect to the Internet or other public network, through HTTP server 275 or other suitable web server such as an File Transfer Protocol (FTP) server, to retrieve HTTP webpages and other data. Requests for webpages are typically routed through MDS 274 and then to HTTP server 275, through suitable firewalls and other protective mechanisms. The web server then retrieves the webpage over the Internet, and returns it to MDS 274. As described above in relation to management server 272, MDS 274 is typically provided, or associated, with an encoder 277 that permits retrieved data, such as retrieved webpages, to be compressed, using any suitable compression technology (e.g. YK compression, and other known techniques), and encrypted (e.g. using an encryption technique such as DES, Triple DES, or AES), and then pushed to the portable electronic device 100 via the shared network infrastructure 224 and the wireless network 200.

The contact server 276 can provide information for a list of contacts for the user in a similar fashion as the address book on the portable electronic device 100. Accordingly, for a given contact, the contact server 276 can include the name, phone number(s), work address(es) and e-mail address(es) of the contact, among other information. The contact server 276 can also provide a global address list that contains the contact information for all of the contacts associated with the host system 250.

It will be understood by persons skilled in the art that the management server 272, the MDS 274, the HTTP server 275, the contact server 276, the device manager module 278, the data store 284 and the IT policy server 286 do not need to be implemented on separate physical servers within the host system 250. For example, some or all of the functions associated with the management server 272 may be integrated with the message server 268, or some other server in the host system 250. Alternatively, the host system 250 may include multiple management servers 272, particularly in variant implementations where a large number of portable electronic devices need to be supported.

The device manager module 278 provides an IT administrator with a graphical user interface with which the IT administrator interacts to configure various settings for the portable electronic devices 100. As mentioned, the IT administrator can use IT policy rules to define behaviors of certain applications on the portable electronic device 100 that are permitted such as phone, web browser or Instant Messenger use. The IT policy rules can also be used to set specific values for configuration settings that an organization requires on the portable electronic devices 100 such as auto signature text, WLAN/VoIP/VPN configuration, security requirements (e.g. encryption algorithms, password rules, etc.), specifying themes or applications that are allowed to run on the portable electronic device 100, and the like.

Figure 5:
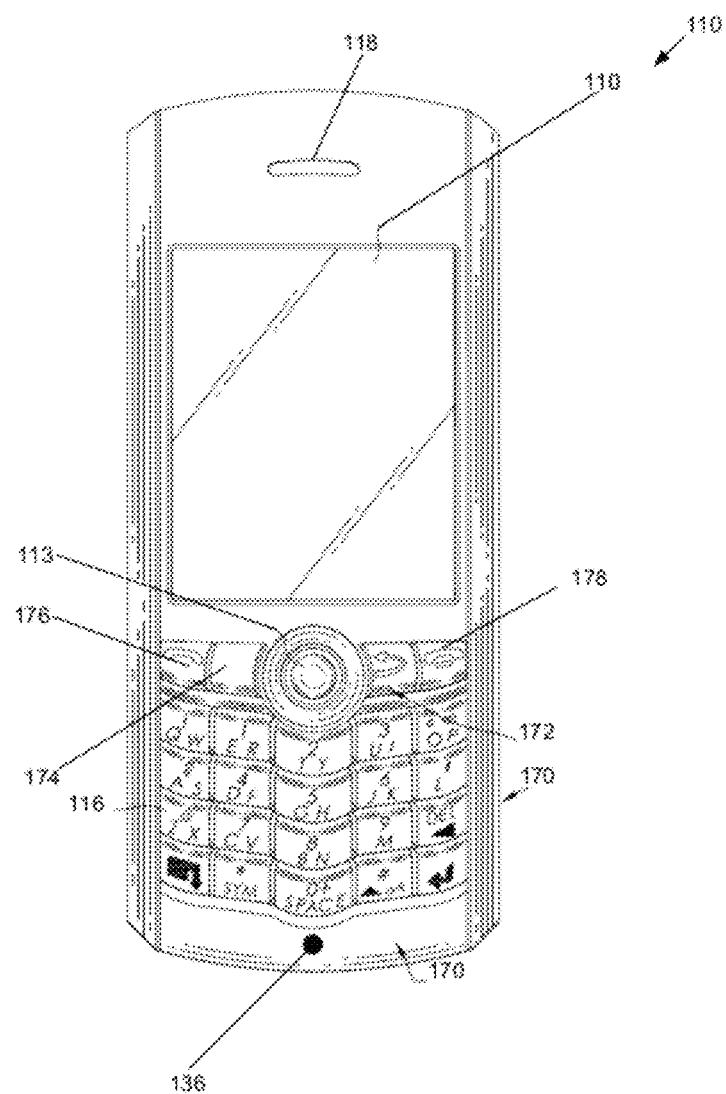
FIG. 5 is an example portable electronic device according to one example embodiment.

Reference is now made to FIG. 5, which shows an example portable electronic device 100 in accordance with an example embodiment. It will be appreciated that the present application is not limited to the portable electronic device 100 shown in FIG. 5 and many other portable electronic devices are possible as indicated hereinabove. The portable electronic device 100 includes a housing 170 that frames the LCD display 110, the speaker 118, the trackball 113, the keyboard 116, and the microphone 136. The trackball 113 can be rolled within a socket for user-input and can be inwardly depressed as a means for providing additional user-input. The keyboard 116 includes input keys such as an exit key 172, a menu key 174, an initiate call key 176 and an end call key 178. The housing 170 is made from a suitable material as will occur to those skilled in the art and can be stored, for example, in a holster (not shown) that includes an attachment for attaching to a user's belt.

A method of managing storage of data at an electronic device such as the portable electronic device 100 includes provisioning a new PIM service account including address book functionality on the electronic device, and updating address book data records stored on the electronic device and not associated with another PIM service account to associate the address book data records with the new PIM service account provisioned on the electronic device.

As indicated above, the portable electronic device includes the Personal Information Manager (PIM) 142 that includes functionality for organizing and managing data items of interest to the user, such as, but not limited to, e-mail, address book data records, calendar data records, voice mails, and task items. PIM applications include, for example, calendar, address book, tasks and memo applications.

The address book application provide a graphical user interface for creating, viewing and managing address book data including contacts names, addresses, email addresses, telephone numbers, and other information when executed by the processor 102.

It will also be appreciated that the calendar applications are used for displaying and storing calendar data such as appointments, lectures, exams, movies, meetings, performances, dinners, ceremonies, etc., when executed by the processor 102. Each calendared event record can include a variety of information including a date and time of the event.

The persistent store, which in the present example embodiment is the flash memory 108, includes the applications software referred to above such as the PIM 142 (shown in FIG. 1), which includes a PIM service manager application. The PIM service manager application begins on startup of the portable electronic device 100 and, in the present example embodiment, runs in the background on the portable electronic device 100. The PIM service manager application is responsible for receiving service record changes including additions, modifications and deletions, for maintaining and managing the storage of PIM data records including address book data records and for managing connections to different PIM services.

Figure 6:
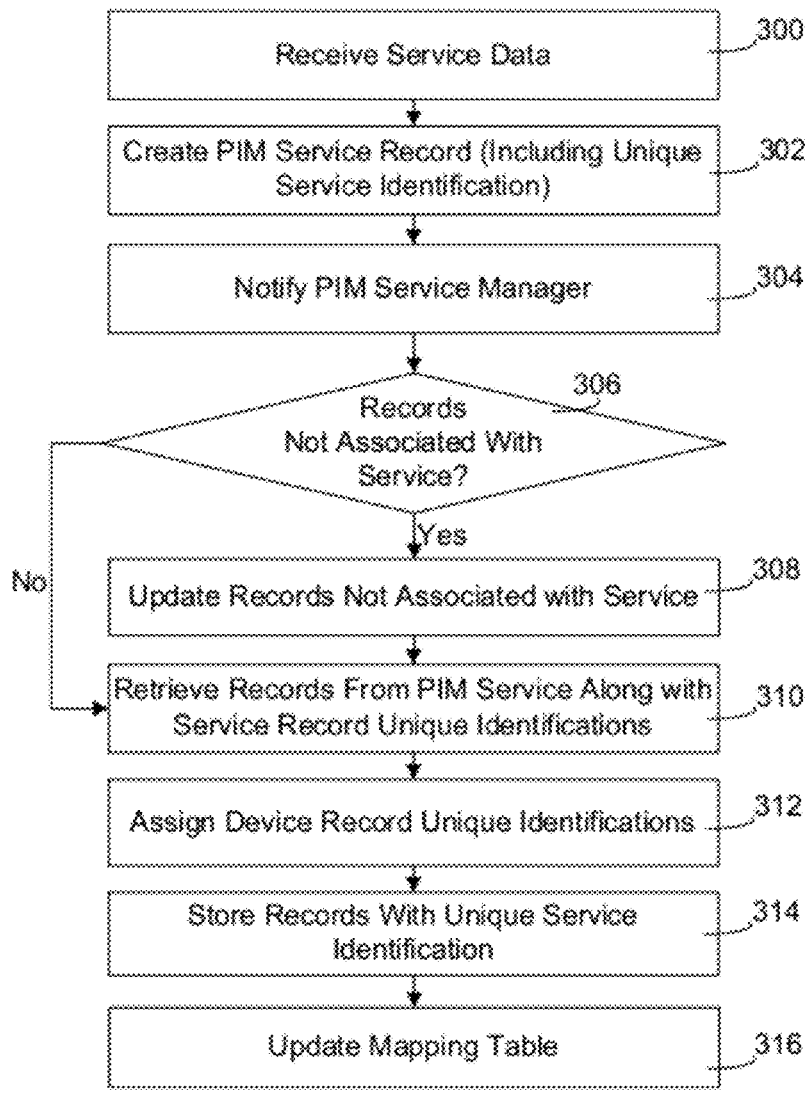
FIG. 6 is a flowchart illustrating steps carried out at the portable electronic device in managing storage of address book data records according to an example embodiment.

Referring now to FIG. 6, there is shown a flowchart illustrating steps carried out at the portable electronic device 100 for managing storage of address book data records according to an example embodiment. A PIM service record is created any time a new PIM service is provisioned on the portable electronic device 100. PIM services that can be provisioned on the portable electronic device 100 include any suitable PIM services such as online or Web-based services, for example, offered by Yahoo™ or Google™, enterprise PIM services such as PIM services provided through the host system 250 described above with reference to FIG. 4, or any other suitable PIM service. The PIM service records are contained within service books at the portable electronic device 100. In other words, when a new PIM service is added (also referred to herein as provisioned) to enable viewing and storage of address book data records on the portable electronic device 100, a PIM service record is created. A data packet is received at the portable electronic device 100 including information about the new PIM service (step 300) that is parsed to create the service record (step 302). The PIM service record includes information from the data packet such as, for example, a unique identifier of the service (SSRPID), a datasource identifier or address of where the user's data is stored on the server with which it is associated (datasourceID), a unique identifier, identifying the user on the server (userID), and the capabilities. Thus, the PIM service, the location of the user's PIM records and the user's identification are all received in the PIM service record. The PIM service record information is used to create a unique service identification for uniquely identifying each PIM service and for tagging the associated data for identification of the PIM service to which it belongs (the PIM service that the data is sent/received from or stored in). For certain PIM services some data such as a User ID may not be available and certain data may be created at the portable electronic device 100 for identification purposes. The unique service identification can be created many different ways, for example, using any suitable one of or a combination of hashing, bit shifting and concatenating operations. The unique service identification is created such that for a respective PIM service the same unique service identification is always created. Thus, for example, if a user deregisters from a PIM service and later re-registers the same PIM service on the portable electronic device 100 (provisions the PIM service again), the same unique service identification is created. When the user de-registers from a service, data remains on the device portable electronic device 100. The data is later determined to be associated with the "new" PIM service record that is created when the user again provisions the same PIM service on the portable electronic device. Thus, the PIM data records stored on the device are associated with the correct PIM service via the unique service identification (service UID). The capabilities include information for data exchange with the address book service such as, routing information, content types and synchronization capability (pull capability only or full synchronization capability). From the information in the PIM service record, a notification is sent to the PIM service manager application in the form of an addition, update or removal. In the case of an addition of a PIM service, an addition notification is sent to the PIM service manager application (step 304) from the service book.

The PIM service manager application acts as an intermediary or middle manager by managing the PIM services for the PIM applications including the address book application, for example. The PIM service manager application uses the information embedded in the notification from step 304 for initiating retrieval of the PIM data records from the PIM service based on the synchronization capabilities defined in the PIM service record and to create a mapping table of service record unique identifications for address book data records to respective device record unique identifications for the new PIM service that is provisioned.

It will be appreciated that each of the address book data records at the PIM service are associated with a respective service record unique identification for the purpose of uniquely identifying each address book data record. The service record unique identification (service record UID) is assigned at the PIM service account server and can be created in any suitable manner. For example, an integer may be assigned using the next available integer for the PIM service type. In the present example embodiment, the service record unique identifications are converted to negative values of the same integers, respectively, when the service record unique identifications are received along with the respective address book data records as referred to below. Since it may be possible that two address book data records from two different PIM services can be assigned the same service record UID, a respective device record unique identification (device record UID) is assigned to each of the address book data records received at the portable electronic device 100 from the PIM service. The device record UIDs can be created in any suitable manner. In the present example embodiment, a UID generator obtains the next available integer for the portable electronic device 100. Each of the address book data records is tagged at the portable electronic device 100 with the respective device record UID, the service record UID and the service UID, for uniquely identifying the address book data record at the portable electronic device 100, and at the service and for identifying the service to which it belongs, respectively. For example, each address book data record can be tagged with the device record UID, a service record UID and a service UID, each in separate integer fields. The device record UID and service record UID tags can be stored in, for example, respective 4-byte integer fields and the service UID can be stored in, for example, an 8-byte integer field.

As indicated above, a mapping table is created. In the present example embodiment, a mapping table can include a table of sub-tables, with a sub-table provided for each PIM service provisioned on the portable electronic device 100. The sub-table for each PIM service is identified by the service UID and includes a mapping of service record UIDs to device record UIDs for look-up for matching address book data records at the PIM service with address book data records at the portable electronic device.

It will be appreciated that address book data records that are not associated with any PIM service can be stored at the portable electronic device 100. For example, a user can create any number of new address book data records locally at the portable electronic device 100 using the graphical user interface of an address book application, prior to provisioning any PIM service on the portable electronic device 100. For example, a new address book data record can be added by selecting a "New" option from a menu or submenu displayed on the LCD display 110, using the trackball 113 and by entering data in respective fields in a "New" address book data record using the keyboard 116. Thus, the portable electronic device 100 can include address book data records that are not associated with any PIM service and are therefore not tagged with any service UID. The address book data records not associated with any PIM service are assigned respective service record UIDs which are equivalent to the device record UIDs created at the portable electronic device 100, but have an invalid service UID or default service UID.

It is determined if there are address book data records stored at the portable electronic device 100 that are not associated with any PIM service (step 306). These address book data records include respective device record UIDs and the assigned service record UIDs. The address book data records stored at the portable electronic device 100 that are not associated with any PIM service are included in the mapping table for address book data records in a default sub-table. The records in the default sub-table are considered unassociated (without association to a PIM service) and are retrieved directly.

If it is determined that there are no address book data records that are not associated with a PIM service, the process proceeds to step 310 where the address book data records from the new PIM service are retrieved. If, on the other hand, it is determined that there is one or more address book data records that are not associated with a PIM service, the address book data records that are not associated with a service are updated at the portable electronic device 100 to associate these address book data records with the new PIM service account provisioned at the portable electronic device (step 308).

Figure 7:
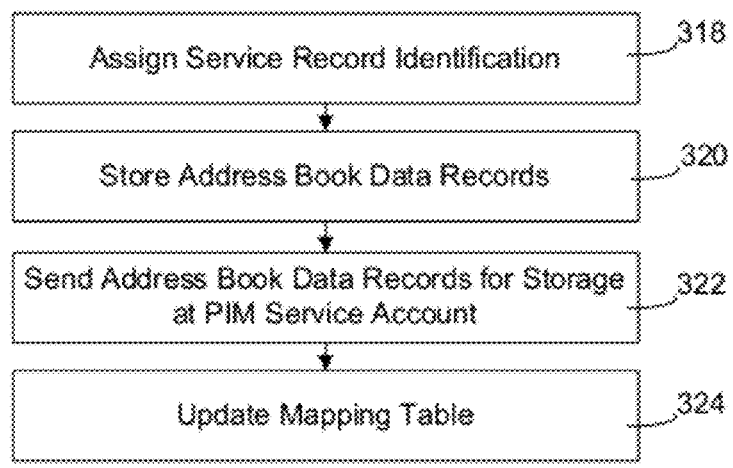
FIG. 7 is a flowchart illustrating sub-steps of the flowchart of FIG. 6.

Reference is now made to FIG. 7 to describe sub-steps of updating address book data records at the portable electronic device 100 according to an example embodiment. The sub-steps identified by the numerals 318 to 324 in FIG. 7 are carried out in step 308 of FIG. 6. Each of the address book data records determined at step 306 to lack association with any PIM service have a respective service record UID, assigned at the portable electronic device 100. As previously described, the service record UID that is assigned is equivalent to the device record UID assigned at the portable electronic device 100. The service record UID of an address book data record created on the portable electronic device 100 is a positive integer, thereby distinguishing the address book data record from other address book data records, as service record UIDs for address book data records from a PIM service are converted to negative integer values at the portable electronic device 100, avoiding conflict between UIDs created by the PIM service and UIDs created by the portable electronic device 100. Each of the address book data records not previously associated with a PIM service is tagged with the respective device record UID, the respective service record UID and the service UID for the new PIM service, for uniquely identifying the address book data record at the device, and at the service and for identifying the service to which it belongs, respectively, as described above. For example, each address book data record can be tagged with the device record UID, a service record UID and a service UID, each in separate integer fields. Thus, the address book data records are updated by tagging with the service UID for the new PIM service. The address book data records including the device record UID, service record UID and service UID, are stored in memory at the portable electronic device 100, which in the present example embodiment is the flash memory 108 (step 320). The address book data records including the device record UID, service record UID and service UID are stored by replacing the previous copies of address book data records that are not associated with a PIM service.

Next, the address book data records determined to lack association with a PIM service are sent for storage at the new PIM service (step 322). The address book data records can be sent to the new PIM service in any suitable manner such as by wireless connection.

As indicated above, the PIM service manager maintains the mapping table including a sub-table for address book data records of service record UIDs to respective device record UIDs for the new PIM service provisioned. The sub-table for the new PIM service is identified by the service UID. Mappings from the default sub-table including mappings of service record UID to device record UID for each of the address book data records that were not previously associated with the PIM service are then updated, moving the mappings from the default mapping table to the mapping table for the new PIM service (step 324).

Thus, the address book data records are associated with the new PIM service provisioned at the portable electronic device 100.

Next, synchronization continues as the address book data records of the new PIM service that are not at the portable electronic device 100 are retrieved from the PIM service along with their respective service record unique identifications (step 310).

As indicated above, a respective device record UID is assigned to each of the address book data records received at the portable electronic device 100 from the PIM service (step 312). Each of the address book data records is tagged at the portable electronic device 100 with the respective device record UID, the service record UID and the service UID, for uniquely identifying the address book data record at the portable electronic device 100, and at the service and for identifying the service to which it belongs, respectively.

The address book data records including the device record UID, service record UID and service UID, are stored in memory at the portable electronic device 100, which in the present example embodiment is the flash memory 108 (step 314).

Mappings for address book data records of service record UIDs to respective device record UIDs for the new address book data records received from the new PIM service provisioned are then added to the sub-table for the new PIM service (step 316).

In the example embodiment described above with particular reference to FIGS. 6 and 7, the address book data records stored on the portable electronic device 100 that are not associated with a PIM service account are automatically updated and stored in association with the new PIM service account provisioned at the portable electronic device 100. It will be appreciated that the order of the steps described herein may vary while still performing the same functions.

Figure 8:
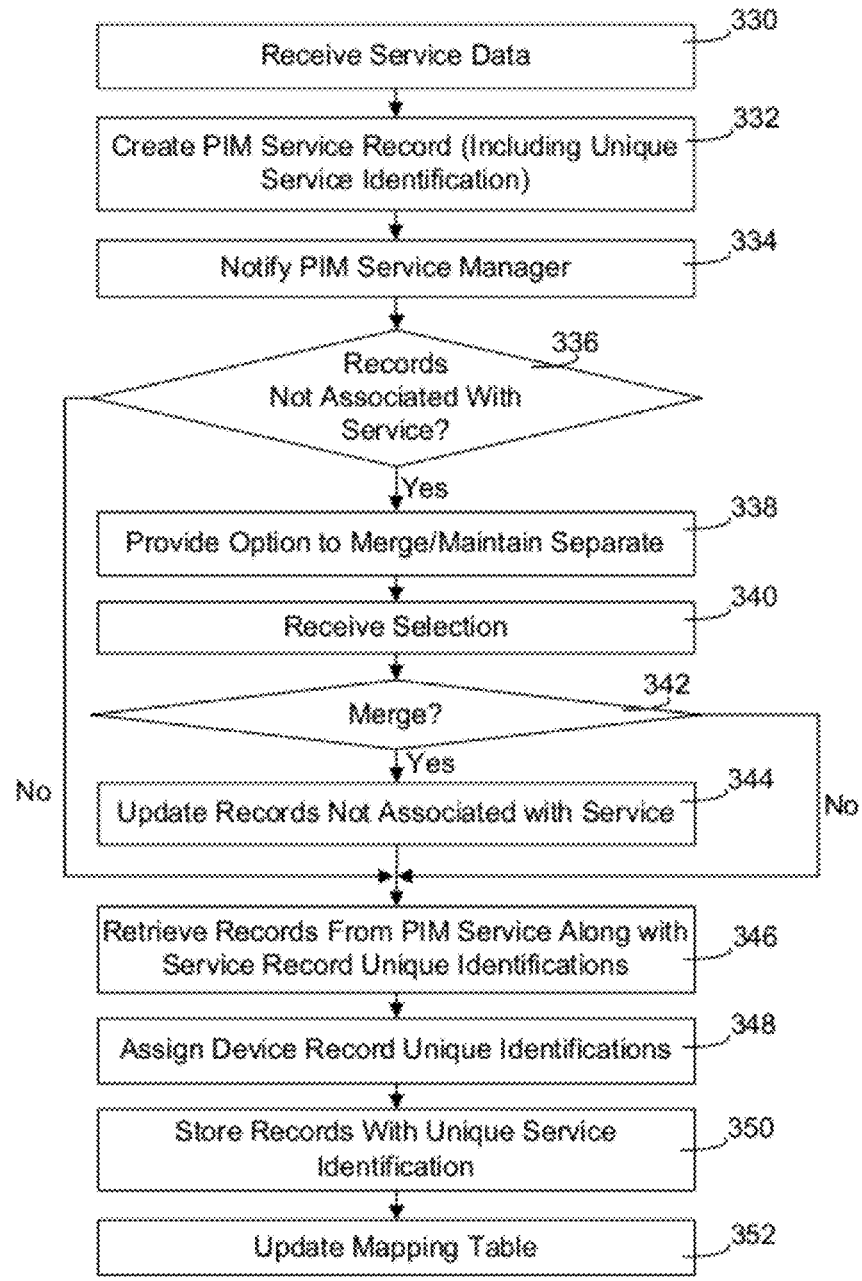
FIG. 8 is a flowchart illustrating steps carried out at the portable electronic device in managing storage of address book data records according to another example embodiment.

Reference is now made to FIG. 8 to describe another example embodiment of the present application. Many of the steps of the present example embodiment are similar to those described above with reference to FIG. 6. Again, a PIM service record is created any time a new PIM service is provisioned on the portable electronic device 100. The data packet is received at the portable electronic device 100 including information about the new PIM service (step 330) that is parsed to create the service record (step 332). The PIM service record includes information from the data packet as described above. In the present case, a new PIM service is provisioned and an addition notification is sent to the PIM service manager application (step 334) from the service book.

It is determined if there are address book data records stored at the portable electronic device 100 that are not associated with any PIM service (step 336). These address book data records include respective device record UIDs and the assigned service record UIDs. The address book data records stored at the portable electronic device 100 that are not associated with any PIM service are included in the mapping table for address book data records in a default sub-table. The records in the default sub-table are considered unassociated (i.e., without association to a PIM service).

If it is determined that there are no address book data records that are not associated with a PIM service, the process proceeds to step 346 where the address book data records from the new PIM service are retrieved. If, on the other hand, it is determined that there is one or more address book data records that are not associated with a PIM service, a user-selectable option is provided in a graphical user interface displayed on the LCD display 110. The user-selectable option includes an option to store the address book data records that are not associated with a PIM service in association with the new PIM service, thereby merging with the address book data records that are not associated with a PIM service with any address book data records received from the PIM service for storage at the portable electronic device 100. A user-selectable option to maintain the address book data records separate so that they are not stored in association with the new PIM service is also provided (step 338).

A user-selection of one of the options provided at step 338 is then received (step 340). If selection of the option to maintain the address book data records separate so that they are not stored in association with the new PIM service is received at step 340, the process proceeds to step 346. On the other hand, receipt of selection of the option to store the address book data records that are not associated with a PIM service in association with the new PIM service acts as a merge command at the portable electronic device 100 at step 342 and the address book data records that are not associated with a PIM service are updated at the portable electronic device 100 to associate these address book data records with the new PIM service account provisioned at the portable electronic device (step 344).

Reference is again made to FIG. 7 to describe sub-steps of updating address book data records at the portable electronic device 100 according to an example embodiment. The sub-steps identified by the numerals 318 to 324 in FIG. 7 are carried out in step 344 of FIG. 8. Each of the address book data records determined at step 336 to lack association with any PIM service have a respective service record UID, assigned at the portable electronic device 100. As previously described, the service record UID that is assigned is equivalent to the device record UID assigned at the portable electronic device 100. The service record UID of an address book data record created on the portable electronic device 100 is a positive integer, thereby distinguishing the address book data record from other address book data records, as service record UIDs for address book data records from a PIM service are converted to negative integer values at the portable electronic device 100, avoiding conflict between UIDs created by the PIM service and UIDs created by the portable electronic device 100. Each of the address book data records not previously associated with a PIM service is tagged with the respective device record UID, the respective service record UID and the service UID for the new PIM service, for uniquely identifying the address book data record at the device, and at the service and for identifying the service to which it belongs, respectively, as described above. For example, each address book data record can be tagged with the device record UID, a service record UID and a service UID, each in separate integer fields. Thus, the address book data records are updated by tagging with the service UID for the new PIM service. The address book data records including the device record UID, service record UID and service UID, are stored in memory at the portable electronic device 100, which in the present example embodiment is the flash memory 108 (step 320). The address book data records including the device record UID, service record UID and service UID are stored by replacing the previous copies of address book data records that are not associated with a PIM service.

Next, the address book data records determined to lack association with a PIM service are sent for storage at the new PIM service (step 322). The address book data records can be sent to the new PIM service in any suitable manner such as by wireless connection.

As indicated above, the PIM service manager maintains the mapping table including a sub-table for address book data records of service record UIDs to respective device record UIDs for the new PIM service provisioned. The sub-table for the new PIM service is identified by the service UID. Mappings from the default sub-table including mappings of service record UID to device record UID for each of the address book data records that were not previously associated with the PIM service are then updated, moving the mappings from the default mapping table to the mapping table for the new PIM service (step 324).

Next, synchronization continues as the address book data records of the new PIM service that are not at the portable electronic device 100 are retrieved from the PIM service along with their respective service record unique identifications (step 346).

As indicated above, a respective device record UID is assigned to each of the address book data records received at the portable electronic device 100 from the PIM service (step 348). Each of the address book data records is tagged at the portable electronic device 100 with the respective device record UID, the service record UID and the service UID, for uniquely identifying the address book data record at the portable electronic device 100, and at the service and for identifying the service to which it belongs, respectively.

The address book data records including the device record UID, service record UID and service UID, are stored in memory at the portable electronic device 100, which in the present example embodiment is the flash memory 108 (step 350).

Mappings for address book data records of service record UIDs to respective device record UIDs for the new address book data records received from the new PIM service provisioned are then added to the sub-table for the new PIM service (step 352).

In the example embodiment described above with particular reference to FIGS. 8 and 7, the address book data records stored on the portable electronic device 100 that are not associated with a PIM service account are updated and stored in association with the new PIM service account provisioned at the portable electronic device 100 in response to receipt of a command at the portable electronic device upon user-selection of an option to store the address book data records in association with the new PIM service account. Rather than providing the option to store the address book data records in association with new PIM service account or the option to maintain these address book data records separately at step 338 as shown in FIG. 8, such an option can be provided in any suitable manner. For example, this option can be set, for example in settings on the portable electronic device 100 or in any other suitable manner.

It will be appreciated that the process described above with reference to FIG. 8 can be carried out each time a new PIM service is provisioned at the portable electronic device 100, thereby giving the user the option to store the address book data records in association with the new PIM service account each time a new PIM service account is provisioned. Alternatively, the process, and particularly the determination of whether or not address book data records exist that are not associated with a PIM service account and the updating of the records not associated with a PIM service account, can be carried out only when the first PIM service is provisioned at the portable electronic.

In the example embodiments described herein, address book data records are stored in association with a PIM service account by tagging the address book data records with the device records UID, service record UID and service UID. A mapping table is also provided. It will now be appreciated that multiple PIM services can be provisioned on the portable electronic device 100 and the address book data records for each can be maintained separately by storing each address book data record in association with the PIM service account to which it belongs. The address book data records from various PIM services can be displayed all together in an address book viewing application by collection of all contacts or can be displayed separately, for example, by providing user-selectable options for user-selection of a PIM service or services from which address book data records are to be displayed. The address book data records for display can then be collected for display based on the user selection.

In the preceding description, for purposes of explanation, numerous details are set forth in order to provide a thorough understanding of the example embodiments of the present application. However, it will be apparent to one skilled in the art that certain specific details are not required. In other instances, features, including functional features, are shown in block diagram form in order not to obscure the description. Further, certain Figures and features are simplified for ease of understanding and explanation. In some cases, for example, specific details are not provided as to whether the example embodiments described herein are implemented as a software routine, hardware circuit, firmware, or a combination thereof.

Example embodiments can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an example embodiment. Those of ordinary skill in the art will appreciate that other instructions and operations necessary to implement the described features can also be stored on the machine-readable medium. Software running from the machine-readable medium can interface with circuitry to perform the described tasks.

When a new PIM service account is provisioned at the portable electronic device, address book data records that are stored at the electronic device and that are not associated with another PIM service account can be stored in association with the new PIM service account, thereby merging the address book data records previously stored only at the electronic device with address book data records at the new PIM service account. This merger provides for backup and storage of address book data records previously stored only at the electronic device by storing copies of the address book data records at the PIM service. Thus, the address book data records previously stored only at the electronic device are sent for storage in a database at the PIM service. This merger of address book data records is performed only for those address book data records not previously associated with a PIM service. Thus, further PIM service accounts can also be provisioned on the electronic device without merging the address book data records from the various PIM service accounts. Thus, storage and backup of address book data records is provided without indiscriminate merging as all address book data records are stored in association with one of the PIM service accounts provisioned on the electronic device. Thus, for example, a user can keep personal and business address book data records separate at the PIM service accounts. Therefore, upon provisioning a new PIM service at the portable electronic device 100, all address book data records previously stored on the portable electronic device 100 are not indiscriminately merged with the new address book data records and are therefore not all sent to the PIM service for storage. Only address book data records not previously associated with a PIM service are sent to the new PIM service and these may be sent only the first time a PIM service is provisioned on the device, thereby reducing transmission time and bandwidth requirements. The storage of address book data records in association with the PIM service account also permits viewing of address book data records in separate lists thereby allowing a user to select and view only address book data records of particular interest on the display device of the portable electronic device. Rendering of PIM data records from only one of a number of PIM databases reduces processing time at the portable electronic device as only data records from the one database of interest are collected and then rendered on the display device.

In a first aspect, there is provided a method of managing storage of data at an electronic device. The method includes provisioning a new PIM service account including address book functionality on the electronic device, and updating address book data records stored on the electronic device and not associated with another PIM service account to associate the address book data records with the new PIM service account provisioned on the electronic device.

In a further aspect, there is provided a portable electronic device. The electronic device includes a memory unit for storage of data, a display device for displaying the data in a graphical user interface, an input device for interaction with the graphical user interface, and a processor connected to the memory, the display device and the input device, for execution of an application for provisioning a new PIM service account including address book functionality on the electronic device, and updating address book data records stored on the electronic device and not associated with another PIM service account to associate those address book data records with the new PIM service account provisioned on the electronic device.

While the example embodiments described herein are directed to particular implementations of the electronic device and method of managing storage of data, it will be understood that modifications and variations to these example embodiments are within the scope and sphere of the present application.

What is claimed is:

1. A method of managing address book data records at an electronic device, comprising:
provisioning, at the electronic device, a Personal Information Manager (PIM) service account including address book functionality;
displaying an option to merge the address book data records stored on the electronic device, with the address book records of the PIM service account, the address book records of the PIM service account comprising service unique identifications for identifying the PIM service account; and
after receiving selection of the option to merge, merging at the electronic device, the address book data records stored on the electronic device with the address book data records of the PIM service account;
wherein the address book data records of the PIM service account are distinguishable from the address book data records stored on the electronic device because service unique identifications of the address book data records stored on the electronic device are invalid service unique identifications or default service unique identifications.

2. The method according to claim 1, comprising sending, from the electronic device, the address book data records for storage at the PIM service account thereby merging the address book data records stored only at the electronic device with address book data records at the PIM service account.

3. The method according to claim 1, wherein provisioning the PIM service account comprises receiving service data for the PIM service account.

4. The method according to claim 3, wherein provisioning the PIM service account comprises creating a PIM service record for the PIM service account.

5. The method according to claim 1, comprising determining if further address book data records are stored at the PIM service account and, if so, storing the further address book data records from the PIM service account in association with the PIM service account at the electronic device.

6. The method according to claim 5, comprising assigning a respective device record unique identification to each of the further address book data records from the PIM service account prior to storing at the electronic device.

7. The method according to claim 6, comprising storing a mapping of each service record unique identification to a respective device record unique identification.

8. The method according to claim 1, wherein merging comprises storing the address book data records in association with the PIM service account.

9. The method according to claim 8, comprising storing a mapping of a service record unique identification to the respective device record unique identification for each of the address book data records.

10. The method according to claim 1, wherein merging comprises storing the address book data records with a PIM service account identifier.

11. The method according to claim 10, wherein merging comprises storing each of the address book data records with a respective device record unique identification.

12. The method according to claim 11, wherein merging comprises storing each of the address book data records with a respective service record unique identification.

13. An electronic device comprising:
a memory unit for storage of data;
a display device for displaying the data in a graphical user interface;
an input device for interaction with the graphical user interface; and
a processor connected to the memory, the display device and the input device, for execution of an application for:
provisioning, at the electronic device, a Personal Information Manager (PIM) service account including address book functionality;
displaying an option to merge the address book data records stored on the electronic device, with the address book records of the PIM service account, the address book records of the PIM service account comprising service unique identifications for identifying the PIM service account; and
after receiving selection of the option to merge, merging at the electronic device, the address book data records stored on the electronic device with the address book data records of the PIM service account;
wherein the address book data records of the PIM service account are distinguishable from the address book data records stored on the electronic device because service unique identifications of the address book data records stored on the electronic device are invalid service unique identifications or default service unique identifications.

14. The electronic device according to claim 13, wherein the processor is configured to send the address book data records for storage at the PIM service account.

15. The electronic device according to claim 13, wherein the PIM service account is created by receiving service data for the PIM service account and creating a PIM service record.

16. The electronic device according to claim 13, wherein the address book records are merged by storing the address book records in association with the PIM service account.

17. A method comprising:
provisioning, at the electronic device, a Personal Information Manager (PIM) service account including address book functionality on the electronic device,
displaying an option to merge first address book data records stored on the electronic device with second address book data records of the PIM service account, the second address book data records of the PIM service account comprising service unique identifications for identifying the PIM service account;
after receipt of selection of the option to merge, merging, at the electronic device, the first address book data records with the second address book data records; and
sending, from the electronic device, the first address book data records for storage at the PIM service account;
wherein the second address book data records of the PIM service account are distinguishable from the first address book data records stored on the electronic device because service unique identifications of the first address book data records are invalid service unique identifications or default service unique identifications.

18. The method according to claim 17, wherein provisioning the PIM service account comprises receiving service data for the PIM service account and creating a PIM service record for the PIM service account.

19. The method according to claim 17, comprising determining if further address book data records are stored at the PIM service account and, if so, storing the further address book data records from the PIM service account in association with the PIM service account at the electronic device.

20. The method according to claim 19, comprising assigning a respective device record unique identification to each of the further address book data records from the PIM service account prior to storing at the electronic device.

* * * * *